US006436313B1

United States Patent
Srivastava et al.

(10) Patent No.: US 6,436,313 B1
(45) Date of Patent: Aug. 20, 2002

(54) RARE EARTH DOPED HALOPHOSPHATE PHOSPHOR

(75) Inventors: Alok Mani Srivastava, Niskayuna, NY (US); William Winder Beers, Chesterland; Thomas Frederick Soules, Richmond Heights, both of OH (US); Holly Ann Comanzo, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/696,591

(22) Filed: Oct. 26, 2000

(51) Int. Cl.[7] .............................. C09K 11/72; C09K 11/73
(52) U.S. Cl. .................. 252/301.4 P; 252/301.4 H; 252/301.4 P; 313/635; 313/486
(58) Field of Search ................ 252/301.4 R, 301.4 H, 252/301.4 P, 301.6 P; 313/635, 486

(56) References Cited

U.S. PATENT DOCUMENTS 3,541,020 A * 11/1970 Mizuno
4,663,563 A 5/1987 Taya et al. .................. 313/487
5,858,277 A 1/1999 Chau et al. ............ 252/301.4 F

FOREIGN PATENT DOCUMENTS

JP 47-24353 * 7/1972

OTHER PUBLICATIONS

G. Blasse and B.C. Grabmaier, "Luminescent Materials", pp. 114–115, Springer–Verlag (1994). No month.
K. H. Butler, "Fluorescent Phosphors", Chapter 3, Penn State Univ. Press (1980). No month.

* cited by examiner

Primary Examiner—C. Melissa Koslow
(74) Attorney, Agent, or Firm—Toan P. Vo; Noreen C. Johnson

(57) ABSTRACT

There is provided a halophosphate phosphor having the formula $(Ca, Mg, Ba, Sr, Zn)_5(PO_4)_3(F, Cl, Br):Sb^{3+}, Mn^{2+}$ doped with at least one rare earth ion which has a higher charge carrier capture cross section than the phosphor lattice defects. The rare earth ion preferentially traps charge carriers and thus decreases the density of color centers. The rare earth ions are preferably trivalent ions selected from $Eu^{3+}$, $Sm^{3+}$, $Yb^{3+}$, $Tm^{3+}$, $Ce^{3+}$, $Tb^{3+}$ and $Pr^{3+}$.

16 Claims, 1 Drawing Sheet

RARE EARTH DOPED HALOPHOSPHATE PHOSPHOR

BACKGROUND OF THE INVENTION

This invention is related generally to luminescent materials, and specifically to antimony and manganese activated halophosphate lamp phosphors doped with rare earth elements.

Halophosphate phosphors are widely used in the fluorescent lighting industry. Such phosphors generally have the formula $Ca_5(PO_4)_3(F,Cl)$. The halophosphate material may contain various activator ions which impart the phosphor property. For example, a europium (Eu) activated halophosphate phosphor absorbs ultraviolet (UV) emission (i.e., exciting radiation) from the mercury plasma in a fluorescent lamp and emits blue-green visible light. However, as disclosed in U.S. Pat. No. 4,663,563, incorporated herein by reference, the Eu activated halophosphate phosphor suffers from an undesirable afterglow effect. In this effect, the phosphor luminescence continues after the excitation from the mercury plasma has been discontinued. In order to decrease the undesirable afterglow effects, the Eu activated halophosphate phosphor is doped with rare earth elements, such as Yb, Nd, Sm, Dy, Ho and Th, as disclosed in U.S. Pat. No. 4,663,563.

In contrast, an antimony (Sb) and manganese (Mn) activated halophosphate phosphor is used for white light emission in fluorescent lamps. The Sb and Mn activated halophosphate phosphor absorbs the UV emission from the mercury plasma in a fluorescent lamp and emits white light. The white light emission process is believed to comprise absorption of the 254 nm mercury emission by the $Sb^{3+}$ activators, blue emission by the $Sb^{3+}$ activators, energy transfer from the $Sb^{3+}$ activators to the $Mn^{2+}$ activators and red-orange emission by the $Mn^{2+}$ activators. The combination of the blue and red-orange emission appears white to a human observer, as described on pages 114–15 of G. Blasse et al, *Luminescent Materials*, Springer-Verlag, 1994, incorporated herein by reference. According to the Blasse textbook, both Sb and Mn activators are believed to be located on the calcium lattice sites in the phosphor lattice. However, Blasse also notes that there is evidence that the Sb ions may also be located on the phosphorus site in the phosphor lattice. The phosphor color (i.e., "warm white" to "cool white," etc.) may be adjusted by adjusting the manganese content in the phosphor, as described on page 33 of chapter 3 of K. H. Butler, *Fluorescent Lamp Phosphors*, Penn State University Press, 1980, the entire chapter incorporated herein by reference.

The prior art Sb and Mn activated halophosphate phosphor suffers from poor efficacy and lumen maintenance, which is a different problem than the afterglow affecting the Eu activated phosphor. Efficacy is the luminosity per unit of input electric power (measured in units of lumens/watt). Lumen maintenance is the ability of the phosphor to resist radiation damage over time. In fluorescent lamps, the prior art Sb and Mn activated halophosphate phosphor suffers from a very rapid initial decrease in the light output. This lumen depreciation in the first few minutes of lamp operation is of the same order of magnitude as the normal lumen depreciation of lamps that have been operating for 2500 hours.

It is believed that the poor efficacy and lumen maintenance are caused by UV-induced visible absorption centers, such as "color centers" and other lattice defects. Color centers are believed to be caused by lattice defects in the halophosphate lattice that trap an electron or a hole, as described on pages 79–80 of K. H. Butler, *Fluorescent Lamp Phosphors*, Penn State University Press, 1980, incorporated herein by reference. It has been established that the color centers are created by the 185 nm exciting radiation emitted by the mercury plasma. The color centers induce an absorption of the exciting radiation anywhere from the deep UV to the infrared region of the spectrum. Thus, these centers can degrade phosphor brightness by either absorbing the visible phosphor emission or by absorbing a part of the 254 nm mercury exciting radiation.

In the prior art, the low phosphor efficacy and lumen maintenance of the halophosphate phosphor was improved by adding cadmium to the phosphor. The addition of a few percent of cadmium to the halophosphate phosphor induced a strong absorption of the 185 nm damaging component of the mercury plasma, which reduced the intensity of this component of the plasma. Consequently, the density of the color centers created in the phosphor was reduced by adding cadmium to the phosphor. The decrease in the density of color centers in the phosphor increased the efficacy and lumen maintenance of the phosphor. However, the use of cadmium has been eliminated in phosphors manufactured in United States and Japan for public health reasons. Therefore, it is desirable to obtain a halophosphate phosphor with an improved efficacy and lumen maintenance, preferably without adding cadmium to the phosphor.

BRIEF SUMMARY OF THE INVENTION

According to one aspect of the present invention, there is provided a luminescent material, comprising a host lattice excluding $YVO_4$, at least a first defect in the host lattice which decreases an efficacy or a lumen maintenance of the luminescent material, at least one type of activator ion located in the host lattice, and a first dopant ion located in the host lattice, said first dopant counteracting an effect of said at least first defect in the host lattice.

According to another aspect of the present invention, there is provided a halophosphate phosphor comprising A D E G:$Sb^{3+}$, $Mn^{2+}$, $R^{3+}$; where A comprises at least one of calcium, magnesium, barium, strontium or zinc; D comprises phosphorus; E comprises oxygen; G comprises at least one of fluorine, chlorine, or bromine; and R comprises at least one trivalent rare earth element.

According to another aspect of the present invention, there is provided a method of making a halophosphate phosphor comprising (a) combining at least one powder comprising at least one element selected from calcium, magnesium, barium, strontium and zinc; phosphorus; at least one halide element selected from fluorine, chlorine and bromine; oxygen; antimony; manganese and at least one trivalent rare earth element and (b) heating the at least one powder to form a solid phosphor body.

DETAILED DESCRIPTION OF THE INVENTION

Figure 1:
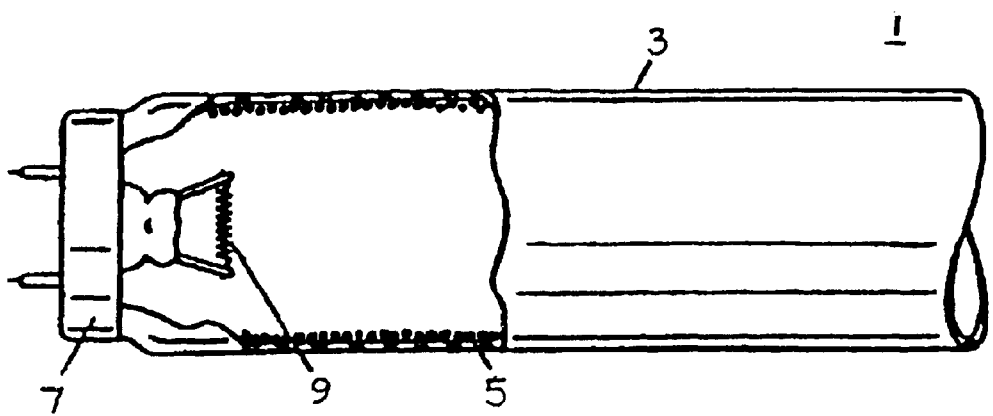
FIG. 1 is a cross-sectional view of a fluorescent lamp according to one preferred aspect of the present invention.

While not wishing to be bound by any theory of operation, the present inventors believe that the 185 nm mercury exciting radiation does not create lattice defects, such as halide ion vacancies. Instead, the radiation creates charge carriers, such as electrons and holes which wander through the crystal lattice of the phosphor until they are trapped at the existing lattice defects, such as the halide ion vacancies. It is the combination of the lattice defect and the charge carrier trapped at the lattice defect which together constitute the defects that negatively impact on the phosphor efficacy and lumen maintenance. For example, the present inventors believe that trapped electrons at the halide ion vacancies constitute the color centers responsible for the rapid decrease of the phosphor lumen output with time during lamp operation.

The present inventors have discovered that the phosphor efficacy and lumen maintenance may be improved by doping the phosphor with suitable ions other than cadmium which preferentially trap the charge carriers generated by the damaging component of the exciting radiation, instead of by adding cadmium to the phosphor in order to reduce the intensity of the damaging 185 nm exciting radiation. The dopant ions preferably have a higher charge carrier (i.e., electron and/or hole) capture cross section than the lattice defects, and thus act as alternative charge carrier trapping centers to the lattice defects. These dopant ions alternative charge carrier trapping centers improve the phosphor efficacy and lumen maintenance by preventing a large number of charge carriers from reaching the lattice defects and forming color centers or other defects which negatively impact on the phosphor efficacy and lumen maintenance. Without a trapped charge carrier, the lattice defect does not act as a color center because it is unable to absorb the visible light generated by the phosphor and is unable to absorb the 254 nm exciting radiation from the mercury plasma. Thus, the dopant ions decrease the number of color centers or other defects that negatively impact on the phosphor efficacy and lumen maintenance.

Preferably, the sole intended function of the dopant ions is to trap charge carriers in the host lattice preferentially to the defects. However, the dopant ions may perform other intended functions in the phosphor, if desired.

In a first preferred embodiment of the present invention, the preferred electron trapping dopant ions comprise trivalent rare earth ions which also exhibit a stable divalent valence state in the host material. Non limiting examples of such rare earth ions are europium ($Eu^{3+}$), samarium ($Sm^{3+}$), ytterbium ($Yb^{3+}$) and thulium ($Tm^{3+}$). The host material, such as the halophosphate phosphor, may contain one or more of such rare earth ions. The concentration of rare earth ions is preferably above the unavoidable or background concentration normally present in the phosphor and may vary between about 1 and 500 parts per million (ppm). For example, the preferred concentration of the $Sm^{3+}$ ions is about 20 ppm and the preferred concentration of the $Yb^{3+}$ ions is about 150 ppm.

The trivalent rare earth ions in the phosphor lattice constitute electron attracting centers because the rare earth ions assume a stable divalent valence state by capturing or trapping an electron: $R^{3+}+e^-=R^{2+}$, where $R^{3+}$ and $R^{2+}$ are the rare earth ion in trivalent and divalent valence state, respectively, and $e^-$ is the free electron in the conduction band. Thus, the ability to form a stable divalent valence state contributes to the electron capture cross section of the rare earth ions. Incorporation of the dopant ions in the trivalent state preferentially traps the electrons created by the 185 nm exciting radiation compared to vacancies on the halide ion lattice site in the halophosphate lattice, because the rare earth ions have a higher electron capture cross section than the halide vacancies. The electron capture by the dopant ions diminishes the concentration of the color centers in the lattice of the halophosphate phosphor. Hence, a higher luminous output may be obtained in the doped halophosphate phosphors due to reduced probability of color center formation. The defects responsible for the color centers have been described as halide vacancies. However, other defects may also be responsible for the color centers.

Some lattice defects in ionic crystals which are responsible for a decrease in efficacy and lumen maintenance trap either holes or both electrons and holes. In the halophosphate materials, hole trapping centers have been observed and are thought to arise from the trapping of holes by "hole trapping defects." For example, such defects may comprise a vacancy on an oxygen lattice site (i.e., an oxygen vacancy) in combination with an oxygen ion on a halide lattice site adjacent to the oxygen vacancy (i.e., a nearest neighbor oxygen vacancy—oxygen on a halide site pair). Hole trapping defects may also comprise +1 metal ions, such as $Na^{1+}$ ions, on the $Ca^{2+}$ lattice sites. Such hole trapping defects may also negatively influence the luminous output of halophosphate phosphor in the same way as the electron trapping halide vacancies.

In a second preferred embodiment of the present invention, the preferred hole trapping dopant ions comprise trivalent rare earth ions which also exhibit a stable tetravalent valence state in the host material. Non limiting examples of such rare earth ions are cerium ($Ce^{3+}$), terbium ($Tb^{3+}$) and praseodymium ($Pr^{3+}$). The host material, such as the halophosphate phosphor, may contain one or more of such rare earth ions.

The trivalent rare earth ions in the phosphor lattice constitute hole attracting centers because the rare earth ions assume a stable tetravalent valence state by capturing or trapping a hole: $R^{3+}+h^+=R^{4+}$, where $R^{3+}$ and $R^{4+}$ are the rare earth ion in the trivalent and tetravalent valence state, respectively, and $h^+$ is the hole in the valence band. Thus, the ability to form a stable tetravalent valence state contributes to the hole capture cross section of the dopant ions. Incorporation of the dopant ions in the trivalent state preferentially traps the holes created by the 185 nm exciting radiation compared to the hole trapping defect in the halophosphate lattice, because the rare earth ions have a higher hole capture cross section than the hole trapping defects. The hole capture by the dopant ions diminishes the concentration of the defect centers in the lattice of the halophosphate phosphor. Hence, a higher luminous output may be obtained in the doped halophosphate phosphors due to reduced probability of color center formation.

In a third preferred embodiment of the present invention, the host material contains both electron and hole trapping ions of the first and second embodiments, respectively. Since the 185 nm exciting radiation creates a plurality of electron-hole pairs, the simultaneous presence of electron and hole capturing ions can greatly diminish the formation of electronic defects in the lattice of the halophosphate phosphor. Thus, the halophosphate phosphor of the third preferred embodiment contains at least one trivalent rare earth ion which also exhibits a stable divalent valence state in the host material, such as $Eu^{3+}$, $Sm^{3+}$, $Yb^{3+}$ and $Tm^{3+}$, and at least one trivalent rare earth ion which also exhibits a stable tetravalent valence state in the host material, such as $Ce^{3+}$, $Tb^{3+}$ and $Pr^{3+}$.

In the first, second and third preferred embodiments, the preferred charge carrier trapping dopant ions were described as trivalent rare earth ions. However, any other ions which preferentially trap charge carriers to minimize or eliminate the effects of the lattice defects may be used instead of the trivalent rare earth ions. For example, Ti or Nb ions may be used in addition to or instead of the trivalent rare earth ions as the electron trapping dopant ions and V ions may be used in addition to or instead of the trivalent rare earth ions as the electron or hole trapping dopant ions, depending on the oxidation state that the V ions assume in the halophosphate lattice.

Furthermore, the host material has been described above as a halophosphate phosphor material. However, the charge trapping dopant ions may be added to any other luminescent material (i.e., a phosphor or single crystal scintillator) which suffers from a reduced efficacy and lumen maintenance due to charge carrier trapping defects.

For example, an alternative host material may comprise $YVO_4$ phosphor doped with $Eu^{3+}$ activator ions ($YVO_4$:$Eu^{3+}$). This phosphor also suffers from decreased lumen maintenance due to the formation of the hole trapping defects (vacancies on the cation lattice sites creating color centers). The lumen maintenance of this phosphor may be improved by adding to the phosphor trivalent rare earth ions which assume a tetravalent state in the host lattice. The preferred charge carrier trapping dopant ions are $Ce^{3+}$, $Pr^{3+}$ and/or $Tb^{3+}$ ions. The most preferred ion is $Tb^{3+}$. The trivalent rare earth ions improve the lumen maintenance by counteracting the negative effects of the lattice defects responsible for the color centers by preferentially trapping the holes created during UV excitation of the phosphor to form a tetravalent ion ($Tb^{4+}$, $Ce^{4+}$ or $Pr^{4+}$).

For example, a linear fluorescent lamp coated with a $YVO_4$:$Eu^{3+}$ phosphor suffered a 25% decrease in lumen output after 100 hours of operation. However, a similar lamp coated with a $YVO_4$:$Eu^{3+}$,$Tb^{3+}$ phosphor suffered only 13% decrease in lumen output after 100 hours of operation. Therefore, the addition of Tb ions improved the lumen maintenance of the lamp phosphor. While in one aspect of the present invention the host lattice excludes $YVO_4$, in a preferred aspect of the present invention, the host lattice includes $Y(V_{1-x}P_x)O_4$ where $0<x<1$.

In the above description, the present inventors have postulated a theory of how the dopant ions, such as the trivalent rare earth ions, improve the efficacy and lumen maintenance of the host material, such as the halophosphate phosphor. However, the inventors do not wish to be bound by any particular theory of operation. For example, the improvement in efficacy and lumen maintenance of the halophosphate phosphor doped with the trivalent rare earth ions may be due to a different mechanism than preferential charge carrier trapping by the dopant ions.

In a fourth preferred embodiment of the present invention, the luminescent material comprises a halophosphate phosphor activated with $Sb^{3+}$ and $Mn^{2+}$ ions and which further contains at least one trivalent rare earth ion. The halophosphate phosphor of the fourth preferred embodiment emits white light (such as light ranging from "cool-white" to "warm-white") and has the following formula:

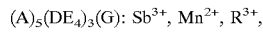

ADEG:$Sb^{3+}$, $Mn^{2+}$, $R^{3+}$, where A comprises at least one of calcium, barium, magnesium, strontium or zinc, D comprises phosphorus, E comprises oxygen, G comprises at least one of fluorine, chlorine and bromine and R comprises at least one trivalent rare earth element. Preferably, R comprises at least one of $Eu^{3+}$, $Sm^{3+}$, $Yb^{3+}$, $Tm^{3+}$, $Ce^{3+}$, $Tb^{3+}$ and $Pr^{3+}$. The Sb, Mn and R ions are written behind a colon to signify that they are dopant ions instead of the host lattice ions. While it is believed that Sb, Mn and R ions all occupy the A sites in the halophosphate apatite hexagonal lattice, these ions may also occupy the other lattice sites.

If the stoichiometric ratio of the constituents is used, then the halophosphate phosphor of fourth preferred embodiment may be expressed as follows:

$(A)_5(DE_4)_3(G)$: $Sb^{3+}$, $Mn^{2+}$, $R^{3+}$, where A, D, E, G and R have the same definitions as above. In the above formula, the concentration of Sb, Mn and R ions may range from about 1 ppm to about 500 ppm. Of course, the phosphor may also contain additional background or unavoidable impurities. Furthermore, the phosphor may contain slightly non-stoichiometric amounts of each constituent and deviate from the molar ratios in the formula above in order to adjust the color of the radiation emitted by the phosphor, as described on pages 43–45 of K. H. Butler, *Fluorescent Lamp Phosphors*, Penn State University Press, 1980, incorporated herein by reference.

In a fifth preferred embodiment of the present invention, element A comprises calcium and element G comprises at least one of fluorine and chlorine. The halophosphate phosphor of the fifth preferred embodiment may be written as follows:

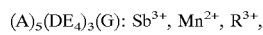

$(A)_5(DE_4)_3(G)$: $Sb^{3+}$, $Mn^{2+}$, $R^{3+}$, where A comprises calcium, D comprises phosphorus, E comprises oxygen, G comprises at least one of fluorine or chlorine and R comprises at least one trivalent rare earth element. Preferably, R comprises at least one of $Eu^{3+}$, $Sm^{3+}$, $Yb^{3+}$, $Tm^{3+}$, $Ce^{3+}$, $Tb^{3+}$ and $Pr^{3+}$. Most preferably, R comprises at least one element selected from the group of $Eu^{3+}$, $Sm^{3+}$, $Yb^{3+}$ and $Tm^{3+}$, and at least one element selected from the group of $Ce^{3+}$, $Tb^{3+}$ and $Pr^{3+}$. If the above elements are substantially unsubstituted by other dopants, then the phosphor of the fifth preferred embodiment may be written as $Ca_5(PO_4)_3(F_{1-x}Cl_x)$:$Sb^{3+}$, $Mn^{2+}$, $R^{3+}$, where $0 \leq x \leq 1$ and the concentration of Sb, Mn and R ions ranges from about 1 ppm to about 500 ppm each. Furthermore, the phosphor may contain slightly non-stoichiometric amounts of each constituent and deviate from the molar ratios in the formula above in order to adjust the color of the radiation emitted by the phosphor.

The halophosphate material according to the preferred embodiments of the present invention may be made by any known manufacturing method. Preferably, the halophosphate material comprises a phosphor made by any ceramic powder method.

In one preferred aspect of the present invention, the method of making the phosphor comprises the following steps. In a first step, the starting compounds of the phosphor material are mixed or blended. For example, the starting compound may be at least one powder that is manually blended in a mortar or another suitable container, or mechanically blended using a suitable device such as a ball mill, to form a first composite powder mixture.

The starting powder(s) preferably contain at least one compound containing an alkaline earth metal, such as Ca, Ba, Mg and/or Sr, and/or Zn at least one compound containing a halogen, such as F, Cl and/or Br, at least one compound containing phosphorus, at least one compound containing antimony, at least one compound containing manganese, at least one compound containing a rare earth, such as $Eu^{3+}$, $Sm^{3+}$, $Yb^{3+}$, $Tm^{3+}$, $Ce^{3+}$, $Tb^{3+}$ and/or $Pr^{3+}$, and wherein at least one of the above compounds also contains oxygen. Of course, the above listed compounds do not have to be mutually exclusive, and a single compound may contain plural starting materials, such as $CaHPO_4$ or $CaF_2$ powders. The powders of the starting compounds may comprise oxide, carbonate, nitrate, oxalates, ammonium and fluoride compounds.

For example, in making the $Ca_5(PO_4)_3(F_{1-x}Cl_x)$: $Sb^{3+}$, $Mn^{2+}$, $R^{3+}$ phosphor, the starting compound powders may comprise $CaCO_3$, $CaHPO_4$, $NH_4Cl$, $CaF_2$, $Sb_2O_3$, $MnCO_3$ and at least one rare earth oxide, such as $CeO_2$, $Pr_2O_3$, $Eu_2O_3$, $Tb_2O_3$, $Yb_2O_3$, $Tm_2O_3$ and/or $Sm_2O_3$. The rare earth oxide(s) may be substituted with rare earth nitrate, fluoride, chloride or oxalate compounds, if desired. The starting powders may contain an excess, non-stoichiometric amount of the halide and/or the antimony component in order to compensate for the halide and antimony loss during the subsequent firing step.

In the second process step, the blended first powder is fired or sintered in suitable container for about 0.75 to 6 hours at about 1000 to 1200° C., preferably 1050° C., in an inert atmosphere, such as a nitrogen atmosphere, to form a sintered body or cake. Preferably, the container is a covered alumina, quartz or silicon carbide/carbon/silicon composite crucible or a porcelain tray. The blended first powder may also optionally be preheated at 600 to 700° C. prior to the firing step or cooled down after the firing step rate of about 100° C./min to about 200° C., if desired.

The solid fired phosphor body may be converted to a second phosphor powder in order to easily coat the phosphor powder on a portion of a fluorescent lamp or other illumination system. The solid phosphor body may be converted to a phosphor powder by any crushing, milling or pulverizing method, such as wet milling, dry milling, jet milling or crushing. Preferably, the solid body is wet milled in water until it has a median particle size of 3–30 microns, and subsequently dried. However, other milling media, such as propanol or methanol, for example, may be used instead. The solid sintered phosphor body and/or the second phosphor powder may optionally be treated with a dilute acid solution followed by washing and a treatment by a dilute ammonium hydroxide solution, if desired to improve the brightness of the phosphor.

The second phosphor powder may then be placed into an illumination system, such as a fluorescent lamp 1 illustrated in FIG. 1 or any other system where the phosphor is desirable, such as a plasma display. Preferably, a suspension of the second phosphor powder and a solvent is used to coat the second phosphor powder onto a surface of the lamp cover 3, preferably the inner surface, and allowed to dry to evaporate the solvent to form a phosphor coating 5. Any coating method, such as dip coating or spray coating, may be used to coat the suspension. The fluorescent lamp also preferably contains a lamp base 7 and at least one electrode, such as a cathode 9. Preferably the lamp 1 contains two electrodes. While a low pressure mercury lamp 1 is illustrated in FIG. 1, the phosphor may be used in any other type of lamp, such as a high pressure mercury lamp.

The suspension may also optionally contain a binder. Preferably, the binder comprises an organic material, such as nitrocellulose or ethylcellulose, in a solvent such as butyl acetate or xylol. The binder enhances the adhesion of the powder particles to each other and to the lamp cover. However, the binder may be omitted to simplify processing, if desired. After coating, the suspension is dried and may be heated to evaporate the binder. However, other methods of placing the phosphor into the illumination system may be used, if desired.

While the invention has been described in detail and with reference to specific embodiments thereof, it will be apparent to one skilled in the art that various changes and modifications can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A luminescent material comprising a halophosphate phosphor which comprises a phosphate ion and at least one counter-ion selected from the group consisting of Ca, Ba, Mg, Sr, and Zn; said halophosphate phosphor being doped with $Sb^{3+}$, $Mn^{2+}$, and at least an additional ion species selected from the group consisting of:
   (a) a trivalent rare earth metal ion when said at least one counter-ion is at least Zn;
   (b) $Tb^{3+}$ when said at least one counter-ion is selected from the group consisting of Ba, Mg, Sr, and Zn;
   (c) at least a trivalent rare earth ion selected from the group consisting of:
      (1) $Sm^{3+}$, $Yb^{3+}$, $Tm^{3+}$, $Ce^{3+}$, and $Pr^{3+}$;
      (2) $Eu^{3+}$ and at least one ion selected from the group consisting of $Sm^{3+}$, $Yb^{3+}$, $Tm^{3+}$, $Ce^{3+}$, and $Pr^{3+}$; and
      (3) $Tb^{3+}$ and at least one ion selected from the group consisting of $Yb^{3+}$, $Tm^{3+}$, $Ce^{3+}$, and $Pr^{3+}$
   when said counter-ion is an alkaline earth metal ion.

2. A halophosphate phosphor comprising:

$$A_5(PO_4)_3G:Sb^{3+}, Mn^{2+}, R^{3+};$$

wherein A comprises at least an ion of an element selected from the group consisting of Mg, Ba, Sr, and Zn;

G comprises at least one ion of an element selected from the group consisting of fluorine, chlorine, and bromine; and $R^{3+}$ comprises at least one ion so as to satisfy a condition selected from the group consisting of:
   (a) $R^{3+}$ comprising a trivalent rare earth metal ion when A is at least Zn; and
   (b) $R^{3+}$ is at least one trivalent rare earth ion selected from the group consisting of:
      (1) $Sm^{3+}$, $Yb^{3+}$, $Tm^{3+}$, $Ce^{3+}$, and $Pr^{3+}$;
      (2) $Eu^{3+}$ and at least one ion selected from the group consisting of $Sm^{3+}$, $Yb^{3+}$, $Tm^{3+}$, $Ce^{3+}$, and $Pr^{3+}$;
      (3) $Tb^{3+}$ and at least one ion selected from the group consisting of $Yb^{3+}$ $Tm^{3+}$, $Ce^{3+}$, and $Pr^{3+}$; and
      (4) $Tb^{3+}$
   when A consists essentially of at least an element selected from the group consisting of Mg, Ba, and Sr.

3. A halophosphate phosphor comprising:

$$A_5(PO_4)_3G:Sb^{3+}, Mn^{2+}, R^{3+};$$

wherein A comprises at least an ion of an element selected from the group consisting of Ca, Mg, Ba, Sr, and Zn;

G comprises at least one ion of an element selected from the group consisting of fluorine, chlorine, and bromine; and $R^{3+}$ comprises at least one ion selected from the group consisting of:
   (a) at least one trivalent rare earth ion selected from the group consisting of $Eu^{3+}$, $Sm^{3+}$, $Yb^{3+}$, and $Tm^{3+}$ and at least one trivalent rare earth ion selected from the group consisting of $Ce^{3+}$ and $Pr^{3+}$;
   (b) at least one trivalent rare earth ion selected from the group consisting of $Yb^{3+}$ and $Tm^{3+}$ and at least one trivalent rare earth ion selected from the group consisting of $Ce^{3+}$, $Pr^{3+}$, and $Tb^{3+}$; and (c) Tb$^{3+}$; at least one trivalent rare earth ion selected from the group consisting of Eu$^{3+}$, Sm$^{3+}$, Yb$^{3+}$, and Tm$^{3+}$; and at least one trivalent rare earth ion selected from the group consisting of Ce$^{3+}$ and Pr$^{3+}$.

4. A halophosphate phosphor comprising:

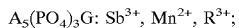

$A_5(PO_4)_3G$: Sb$^{3+}$, Mn$^{2+}$, R$^{3+}$;

wherein A comprises at least an ion of an element selected from the group consisting of Ca, Mg, Ba, Sr, and Zn;

G comprises at least one ion of an element selected from the group consisting of fluorine, chlorine, and bromine; and R$^{3+}$ comprises at least one trivalent rare earth ion; and wherein a concentration of each of said Sb$^{3+}$, Mn$^{2+}$, R$^{3+}$ is in the range from about 1 ppm to about 500 ppm.

5. The luminescent material of claim 4, wherein:

A comprises calcium; and

G comprises at least one of fluorine or chlorine.

6. The luminescent material of claim 5, wherein the halophosphate phosphor comprises $(Ca)_5(PO_4)_3(F_{1-x}Cl_x)$: Sb$^{3+}$, Mn$^{2+}$, R$^{3+}$; and wherein $0 \leq x \leq 1$.

7. A fluorescent lamp, comprising:

a lamp cover;

a phosphor layer comprising a luminescent material on a surface of the cover;

a lamp base; and at least one electrode;

wherein said luminescent material comprises a halophosphate phosphor comprising:

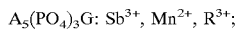

$A_5(PO_4)_3G$: Sb$^{3+}$, Mn$^{2+}$, R$^{3+}$;

wherein A comprises at least an ion of an element selected from the group consisting of Mg, Ba, Sr, and Zn;

G comprises at least one ion of an element selected from the group consisting of fluorine, chlorine, and bromine; and R$^{3+}$ comprises at least one ion so as to satisfy a condition selected from the group consisting of:
(a) R$^{3+}$ comprising a trivalent rare earth metal ion when A is at least Zn; and
(b) R$^{3+}$ is at least one trivalent rare earth ion selected from the group consisting of:
(1) Sm$^{3+}$, Yb$^{3+}$, Tm$^{3+}$, Ce$^{3+}$, and Pr$^{3+}$;
(2) Eu$^{3+}$ and at least one ion selected from the group consisting of Sm$^{3+}$, Yb$^{3+}$, Tm$^{3+}$, Ce$^{3+}$, and Pr$^{3+}$;
(3) Tb$^{3+}$ and at least one ion selected from the group consisting of Yb$^{3+}$, Tm$^{3+}$, Ce$^{3+}$, and Pr$^{3+}$; and
(4) Tb$^{3+}$
when A consists essentially of at least an element selected from the group consisting of Mg, Ba, and Sr.

8. A fluorescent lamp comprising:

a lamp cover;

a phosphor on a surface of the cover;

a lamp base; and at least one electrode;

wherein said phosphor comprises a halophosphate phosphor which comprises a phosphate ion and at least one counter-ion selected from the group consisting of Ca, Ba, Mg, Sr, and Zn; said halophosphate phosphor being doped with Sb$^{3+}$, Mn$^{2+}$, and at least an additional ion species selected from the group consisting of:
(a) a trivalent rare earth metal ion when said at least one counter-ion is at least Zn;
(b) Tb$^{3+}$ when said at least one counter-ion is selected from the group consisting of Ba, Mg, Sr, and Zn;
(c) at least a trivalent rare earth ion selected from the group consisting of:
(1) Sm$^{3+}$, Yb$^{3+}$, Tm$^{3+}$, Ce$^{3+}$, and Pr$^{3+}$;
(2) Eu$^{3+}$ and at least one ion selected from the group consisting of Sm$^{3+}$, Yb$^{3+}$, Tm$^{3+}$, Ce$^{3+}$, and Pr$^{3+}$; and
(3) Tb$^{3+}$ and at least one ion selected from the group consisting of Yb$^{3+}$, Tm$^{3+}$, Ce$^{3+}$, and Pr$^{3+}$
when said at least one counter-ion is an alkaline earth metal ion.

9. A method of making a halophosphate phosphor, said method comprising:
(a) combining to form a mixture compounds of:
(1) at least one divalent metal element selected from the group consisting of Mg, Ba, Sr, and Zn;
(2) phosphorus;
(3) at least one halogen element selected from the group consisting of fluorine, chlorine, and bromine;
(4) oxygen;
(5) antimony;
(6) manganese; and
(7) at least one trivalent ion so as to satisfy a condition selected from the group consisting of:
(i) said at least one trivalent ion comprising at least one trivalent rare earth ion when said at least one divalent metal element is at least Zn;
(ii) when said divalent metal element is selected from the group consisting of Mg, Ba, and Sr, said at least one trivalent ion being selected from the group consisting of:
(A) Sm$^{3+}$, Yb$^{3+}$, Tm$^{3+}$, Ce$^{3+}$, and Pr$^{3+}$;
(B) Eu$^{3+}$ and at least one ion selected from the group consisting of Sm$^{3+}$, Yb$^{3+}$, Tm$^{3+}$, Ce$^{3+}$, and Pr$^{3+}$;
(C) Tb$^{3+}$ and at least one ion selected from the group consisting of Yb$^{3+}$, Tm$^{3+}$, Ce$^{3+}$, and Pr$^{3+}$; and
(D) Tb$^{3+}$; and
(b) heating said mixture to form a solid phosphor body.

10. A method for making a lamp, said method comprising:
(a) preparing a halophosphate;
(b) converting the solid phosphor body into a phosphor powder;
(c) placing the phosphor powder in a suspension containing a solvent and a binder;
(d) coating the suspension onto a surface of a lamp cover;
(e) drying the suspension; and
(f) heating the suspension to evaporate the binder;
wherein said preparing said halophosphate comprises the steps of:
(I) combining to form a mixture compounds of:
(1) at least one divalent metal element selected from the group consisting of Mg, Ba, Sr, and Zn;
(2) phosphorus;
(3) at least one halogen element selected from the group consisting of fluorine, chlorine, and bromine;
(4) oxygen;
(5) antimony;
(6) manganese; and (7) at least one trivalent ion so to satisfy a condition selected from the group consisting of:
  (i) said at least one trivalent ion comprising at least one trivalent rare earth ion when said at least one divalent metal element is at least Zn;
  (ii) when said divalent metal element is selected from the group consisting of Mg, Ba, and Sr, said at least one trivalent ion being selected from the group consisting of:
    (A) $Sm^{3+}$, $Yb^{3+}$, $Tm^{3+}$, $Ce^{3+}$, and $Pr^{3+}$;
    (B) $Eu^{3+}$ and at least one ion selected from the group consisting of $Sm^{3+}$, $Yb^{3+}$, $Tm^{3+}$, $Ce^{3+}$, and $Pr^{3+}$;
    (C) $Tb^{3+}$ and at least one ion selected from the group consisting of $Yb^{3+}$, $Tm^{3+}$, $Ce^{3+}$, and $Pr^{3+}$; and
    (D) $Tb^{3+}$; and
  (II) heating said mixture to form a solid phosphor body.

11. A method of making a halophosphate phosphor, said method comprising:
(a) combining to form a mixture compounds of:
  (1) Ca;
  (2) phosphorus;
  (3) at least one halogen element selected from the group consisting of fluorine, chlorine, and bromine;
  (4) oxygen;
  (5) antimony;
  (6) manganese; and
  (7) at least one trivalent ion so to satisfy a condition selected from the group consisting of:
    (i) $Sm^{3+}$, $Yb^{3+}$, $Tm^{3+}$, $Ce^{3+}$, and $Pr^{3+}$;
    (ii) $Eu^{3+}$ and at least one ion selected from the group consisting of $Sm^{3+}$, $Yb^{3+}$, $Tm^{3+}$, $Ce^{3+}$, and $Pr^{3+}$;
    (iii) $Tb^{3+}$ and at least one ion selected from the group consisting of $Yb^{3+}$, $Tm^{3+}$, $Ce^{3+}$, and $Pr^{3+}$; and
    (iv) a combination of trivalent rare earth ions, said combination excluding combinations consisting of ions selected from the group consisting of $Dy^{3+}$, $Eu^{3+}$, and $Tb^{3+}$; and
(b) heating said mixture to form a solid phosphor body.

12. A halophosphate phosphor comprising:

$$Ca_5(PO_4)_3G: Sb^{3+}, Mn^{2+}, R^{3+};$$

wherein G comprises at least one ion of an element selected from the group consisting of fluorine and chlorine; and $R^{3+}$ comprises at least one trivalent rare earth ion so to satisfy a condition selected from the group consisting of:
  (a) $Sm^{3+}$, $Yb^{3+}$, $Tm^{3+}$, $Ce^{3+}$, and $Pr^{3+}$;
  (b) $Eu^{3+}$ and at least one ion selected from the group consisting of $Sm^{3+}$, $Yb^{3+}$, $Tm^{3+}$, $Ce^{3+}$, and $Pr^{3+}$;
  (c) $Tb^{3+}$ and at least one ion selected from the group consisting of $Yb^{3+}$, $Tm^{3+}$, $Ce^{3+}$, and $Pr^{3+}$; and
  (d) a combination of trivalent rare earth ions, said combination excluding combinations consisting of ions selected from the group consisting of $Dy^{3+}$, $Eu^{3+}$, and $Tb^{3+}$.

13. The method of claim 12; wherein a concentration of each of said $Sb^{3+}$, $Mn^{2+}$, and $R^{3+}$ is in a range from about 1 ppm to about 500 ppm; and G comprises at least one of fluorine and chlorine.

14. The method of claim 13 wherein said combining said compounds comprises combining:
  a first powder comprising $CaCO_3$;
  a second powder comprising $CaHPO_4$;
  a third powder comprising $NH_4Cl$;
  a fourth powder comprising $CaF_2$;
  a fifth powder comprising $Sb_2O_3$;
  a sixth powder comprising $MnCO_3$; and
  a seventh powder comprising said at least one trivalent ion.

15. The method of claim 14, wherein the seventh powder comprises at least a compound selected from the group consisting of $CeO_2$, $Pr_2O_3$, $Eu_2O_3$, $Tb_2O_3$, $Yb_2O_3$, $Tn_2O_3$, and $Sm_2O_3$.

16. The method of claim 14, wherein step (b) comprises firing the combined first through seventh powders for 0.75 to 6 hours at about 1000 to 1200° C. in a nitrogen atmosphere.

* * * * *